US012467551B2

(12) United States Patent
Cimberio et al.

(10) Patent No.: US 12,467,551 B2
(45) Date of Patent: Nov. 11, 2025

(54) ANTIFREEZE VALVE DEVICE AND PLANT USING SAID DEVICE

(71) Applicant: CIMBERIO HOLDING S.R.L., Milan (IT)

(72) Inventors: Roberto Cimberio, Ameno Fraz. Vacciago (IT); Tiziano Guidetti, Borgomanero (IT); Andrea Chiarello, Oleggio Castello (IT)

(73) Assignee: CIMBERIO HOLDING S.R.L., Milan (IT)

( * ) Notice: Subject to any disclaimer, the term of this patent is extended or adjusted under 35 U.S.C. 154(b) by 59 days.

(21) Appl. No.: 18/519,629

(22) Filed: Nov. 27, 2023

(65) Prior Publication Data

US 2024/0175510 A1   May 30, 2024

(30) Foreign Application Priority Data

Nov. 30, 2022   (IT) .................. 102022000024654

(51) Int. Cl.
  *F16K 31/00*    (2006.01)
  *E03B 7/10*    (2006.01)
  (Continued)

(52) U.S. Cl.
  CPC .............. *F16K 31/002* (2013.01); *E03B 7/10* (2013.01); *E03B 7/12* (2013.01); *F16K 27/02* (2013.01)

(58) Field of Classification Search
  CPC .......... F16K 27/02; F16K 31/002; E03B 7/10; E03B 7/12
  (Continued)

(56) References Cited

U.S. PATENT DOCUMENTS 4,096,877 A * 6/1978 Arledge, II ............... E03B 9/14
137/292
4,117,856 A * 10/1978 Carlson ................ F16K 11/022
285/23

(Continued)

FOREIGN PATENT DOCUMENTS

CN    106592699    4/2017
CN    106 764 021    5/2017
(Continued)

OTHER PUBLICATIONS

Translation of KR 101019819 (Year: 2011).*
(Continued)

*Primary Examiner* — Umashankar Venkatesan
(74) *Attorney, Agent, or Firm* — Mueting Raasch Group

(57) ABSTRACT

The present invention relates to an antifreeze device for hydraulic plants comprising a manifold (2) having a manifold inlet (4), a manifold outlet (5) and an auxiliary opening (6) in fluid communication with a valve body (8) engaged to the manifold. The valve body includes an valve inlet facing the auxiliary opening, placed in fluid communication with a drain (10) by means of a chamber (7) housing a temperature-sensitive element (11) sensitive temperature variations. The valve body also includes a shutter (12) movable between a closed position where it closes the auxiliary opening and an open position where it allows fluid to enter through the auxiliary opening, as well as an orifice (13) distinct from the auxiliary opening that places the chamber in fluid communication with the manifold. The present invention also relates to a plant using the antifreeze device (1).

25 Claims, 6 Drawing Sheets

(51) Int. Cl.
E03B 7/12 (2006.01)
F16K 27/02 (2006.01)

(58) Field of Classification Search
USPC .......................................................... 137/62
See application file for complete search history.

(56) References Cited

U.S. PATENT DOCUMENTS

| | | | | | |
|---|---|---|---|---|---|
| 4,296,770 | A | * | 10/1981 | Rice ..................... | G05D 23/023 60/527 |
| 4,638,828 | A | * | 1/1987 | Barrineau, Sr. ....... | F16K 31/002 60/527 |
| 4,815,491 | A | * | 3/1989 | Prikle ....................... | E03B 7/10 251/74 |
| 5,275,192 | A | * | 1/1994 | Lawson .................... | E03B 7/12 137/79 |
| 6,374,848 | B1 | * | 4/2002 | McGhee ................... | E03B 7/12 137/625.69 |
| 6,374,849 | B1 | * | 4/2002 | Howell ................. | F16K 31/002 137/557 |
| 7,686,028 | B2 | * | 3/2010 | Wu .......................... | E03B 7/12 137/454.5 |
| 8,327,867 | B2 | * | 12/2012 | Caleffi ..................... | E03B 7/12 137/79 |
| 8,561,914 | B2 | * | 10/2013 | Jung ........................ | E03B 7/10 137/59 |
| 10,267,021 | B2 | * | 4/2019 | Kim ...................... | F16K 31/002 |
| 11,920,694 | B2 | * | 3/2024 | Caleffi ................. | F16K 31/002 |
| 2012/0112114 | A1 | | 5/2012 | Kim | |

FOREIGN PATENT DOCUMENTS

| | | | | |
|---|---|---|---|---|
| EP | | 2 182 261 | 4/2011 | |
| KR | | 101019819 B1 | * 3/2011 | ............... F16K 1/36 |
| KR | | 10-1156559 | 6/2012 | |
| KR | | 10-2012- 0076855 | 10/2012 | |
| KR | | 10-2013- 0119654 | 11/2013 | |
| KR | | 101402003 B1 | * 5/2014 | ............... E03B 7/12 |
| KR | | 10-2020- 0005138 | 1/2020 | |

OTHER PUBLICATIONS

Translation of KR 101402003 (Year: 2014).*
Search Report for Application No. IT 202200024654 dated May 26, 2023 (8 pages).

* cited by examiner

FIG.4
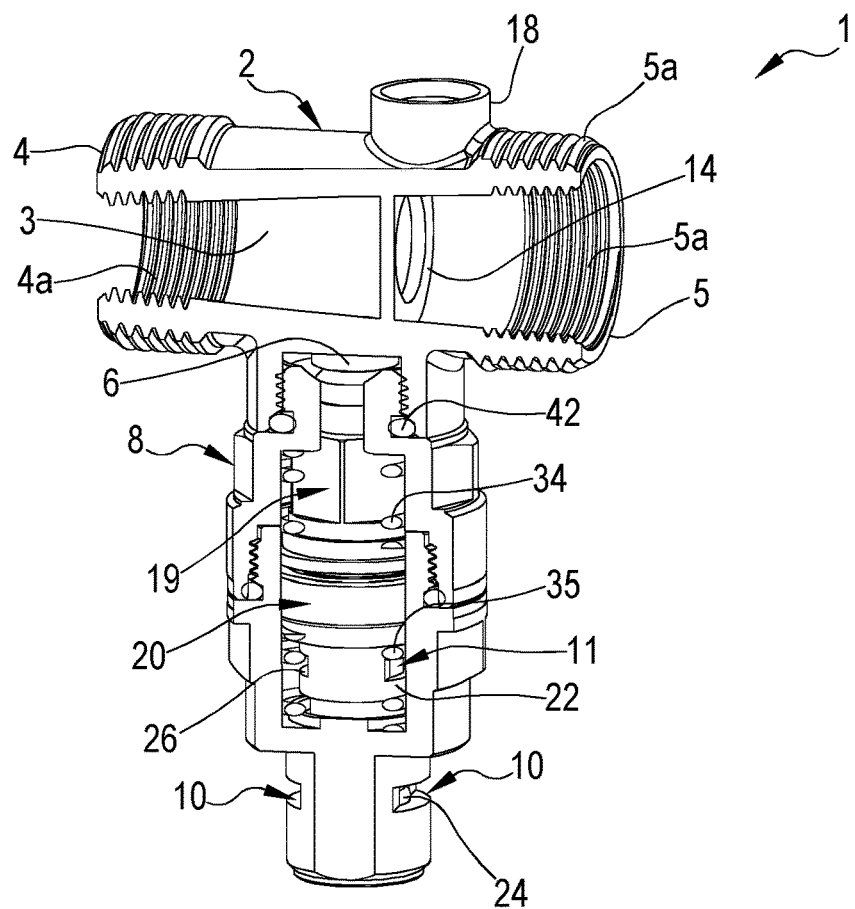
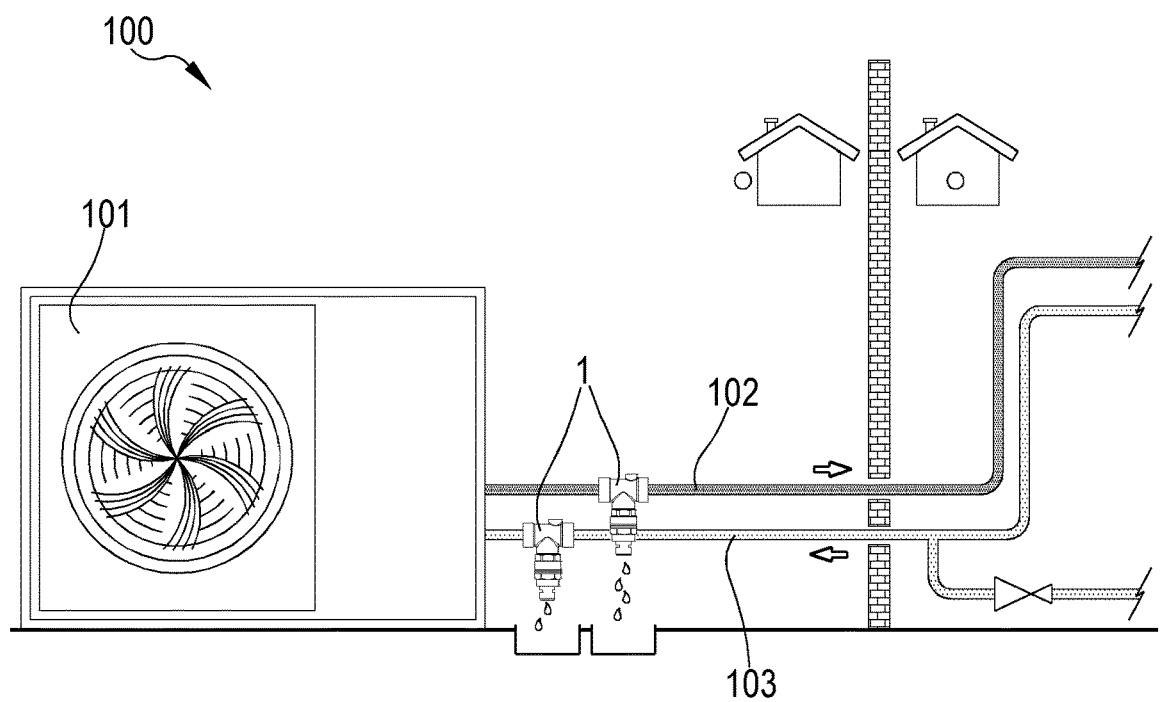
FIG.5

ANTIFREEZE VALVE DEVICE AND PLANT USING SAID DEVICE

TECHNICAL FIELD

The present invention concerns an antifreeze valve device suitable for preventing freezing of water circulating in a hydraulic plant where the antifreeze device operates.

The invention may find advantageous application in plants exposed to frost, such as heat pump heating plants, cooling plants or in irrigation plants.

BACKGROUND ART

Antifreeze devices and valves are known that, following the detection of a change in atmospheric temperature around a predetermined threshold, discharge water into the environment, preventing water stagnation and thus ice formation within the plumbing of the plant, which could lead to pipe breakages or water leaks.

Conventional antifreeze valves comprise a valve body having a water inlet opening connectable to a hydraulic plant, a water outlet opening, and a chamber in fluid communication with the water inlet and outlet openings, within which is housed an actuator sensitive to changes in atmospheric temperature.

Such antifreeze valves also include a control rod that movable by the temperature-sensitive actuator, between a closed position in which the rod occludes the water outlet opening (atmospheric temperature above the threshold value) and an open position in which it allows water to be discharged into the environment (atmospheric temperature below the threshold value).

Although the described valve prevents water freezing in hydraulic plants, such solutions have reliability problems related to both the formation of deposits and debris on the actuator control rod and related to the entry of dirt into the valve body chamber through the water outlet opening, which can compromise the proper operation of the valve in opening and closing.

A second example of an antifreeze valve suitable for overcoming such drawbacks is described in European Patent No. EP2182261B1, which shows a valve that differs from the conventional antifreeze valves described above in that it has a protective casing engaged to the control rod and configured to hermetically house the temperature-sensitive actuator, thus preventing the formation of deposits and the accumulation of dirt on the same temperature-sensitive actuator.

Although the valve described in EP2182261B1 is reliable against deposits and dirt, it is evident that the protective casing thermally insulates the temperature-sensitive actuator, reducing its sensitivity to temperature variations. In fact, following a temperature increase of the fluid circulating in the plant, for example through the activation of a heater or heat pump, the protective casing causes an increase in the transient related to fluid-actuator heat exchange, leading to an increase in valve closing times, and, therefore an undesirable waste of water and energy.

OBJECT OF THE INVENTION

Object of the present invention is, therefore, to address at least one of the drawbacks and/or limitations of previous solutions.

A first object of the present invention is to provide an antifreeze valve device suitable for minimizing the transient related to heat exchange between a fluid and a temperature-sensitive element of the antifreeze device.

It is also an object of the present invention to provide an antifreeze valve device suitable for minimizing the time required to stop water discharge after determining an ambient temperature or a temperature of the fluid circulating in the device, exceeding a threshold value.

It is also an object of the present invention to provide an antifreeze valve device having a simple and compact structure, which may be easily installed on pre-existing domestic and/or industrial hydraulic plants.

It is a further object of the present invention to provide an antifreeze valve device having a high degree of reliability and requiring minimal maintenance interventions.

These objects and others, which will become more apparent from the following description, may be substantially achieved by an antifreeze valve device and plant according to one or more of the following claims and/or aspects.

SUMMARY

One or more of the above objectives are achieved by an antifreeze valve device and plant using said device as claimed.

Aspects of the invention are described below.

In a 1st aspect an antifreeze device for hydraulic plants is provided, comprising:
- a manifold (2) having at least one inlet (4), at least one outlet (5), and at least one channel (3) placing the inlet (4) in fluid communication with the outlet (5), said manifold (2) including an auxiliary opening (6) in interposition between the inlet (4) and the outlet (5),
- a valve body (8) engaged to the manifold (2) and comprising:
  - an valve inlet facing the auxiliary opening (6) of the manifold (2),
  - a drain (10), optionally opposite to the valve inlet, for expelling fluid to the environment,
  - a chamber (7) that places in fluid communication the valve inlet and the drain (10) of the valve body (8),
  - a temperature-sensitive element (11) housed in the chamber (7) and sensitive to temperature variations,
  - a shutter (12) engaged to the temperature-sensitive element (11) inside the chamber (7) and movable between:
    - a closed position where said shutter (12) closes the auxiliary opening (6) of the manifold (2),
    - an open position where said shutter (12) allows fluid to enter through the auxiliary opening (6).

In a 2nd aspect according to the preceding aspect, the manifold (2) includes an orifice (13) distinct from the auxiliary opening (6) and facing the valve inlet of the valve body (8), which places the chamber (7) of the valve body (8) in fluid communication with the channel (3) of the manifold (2).

In a 3rd aspect according to any one of the preceding aspects, the antifreeze device includes an auxiliary shutter (12a) configured to be movable between:
- a closed position where said auxiliary shutter (12a) obstructs the drain (10) of the valve body (8),
- an open position where said auxiliary shutter (12a) places the drain (10) in fluid communication with an environment outside the device.

In a 3bis aspect according to any one of the preceding aspects, the shutter (12), in the open position, defines, in cooperation with a perimeter edge of the auxiliary opening (6), a fluid passage having maximum cross-section.

In a 4th aspect according to the preceding aspect, the shutter (12) is movable in a partially open position where it defines, in cooperation with the perimeter edge of the auxiliary aperture (6), a fluid passage having a cross-section lower than the maximum cross-section.

In a 5th aspect according to the preceding aspect, the antifreeze device is configured to operate in:
- a first operating condition in which the auxiliary shutter (12a) is in the open position and the shutter (12) is also in the open position,
- a second operating condition in which the shutter (12) is in the partially open position while the auxiliary shutter (12a) is in the closed position,
- a third operating condition in which the shutter (12) is in the closed position and the auxiliary shutter (12a) is also in the closed position.

In a 6th aspect according to the preceding aspect if the shutter (12) is in the partially open position, the auxiliary shutter (12a) is in the closed position.

In a 7th aspect according to any one of the preceding aspects the shutter (12) does not open or close the orifice (13), the latter constantly defining a fluid communication between said chamber (7) and the channel (3).

In an 8th aspect according to any one of the preceding aspects the orifice (13) is an opening passing through a perimeter wall of the manifold (2), in interposition between the auxiliary opening (6) and the outlet (5) of the manifold (2).

In a 9th aspect according to any one of the preceding aspects the manifold (2) has a tubular shape.

In a 10th aspect according to any one of the preceding aspects the manifold (2) has a constant cross-section (S1) for a preponderant part of the channel (3).

In an 11th aspect according to the preceding aspect, the orifice (13) has a cross-section (S4) smaller than the cross-section (S1) of the manifold (2).

In a 12th aspect according to any one of the preceding two aspects, the ratio between the cross-section area (S1) of the manifold (2) and the cross-section area (S4) of the orifice (13) is comprised between 1.5 and 50.

In a 13th aspect according to any one of the preceding three aspects, the auxiliary opening (6) has a passage cross-section (S3) smaller than the section (S1) of the manifold (2).

In a 14th aspect according to the preceding aspect, the ratio between the cross-section (S1) of the manifold (2) and the cross-section (S3) of the auxiliary opening (6) is comprised between 1.5 and 10.

In a 15th aspect according to any one of the two preceding aspects, the ratio between the passage cross-section (S3) of the auxiliary opening (6) and the passage cross-section (S4) of the orifice (13) is comprised between 1.5 and 20.

In a 16th aspect according to any one of the preceding aspects, the manifold (2) has a radial shoulder (14), emerging from an inner surface of the manifold (2) internally to the channel (3), wherein said shoulder is interposed between the auxiliary opening (6) and the orifice (13).

In a 17th aspect according to the preceding aspect wherein the shoulder (14) defines a necking of the channel (3) having a cross-section (S2) smaller than the cross-section (S1) of the manifold (2).

In an 18th aspect according to any one of the preceding aspects, the ratio between the cross-section (S2) of the necking and the cross-section (S4) of the auxiliary opening (6) is comprised between 1.5 and 46.

In a 19th aspect according to any one of the preceding aspects, the manifold (2) has a sleeve (15) emerging from an outer surface of the manifold (2) transversely, optionally orthogonally, to the channel (3), wherein said sleeve (15) surrounds the auxiliary opening (6) and the orifice (13) of the manifold (2).

In a 20th aspect according to any one of the preceding aspects, the manifold (2) has a lip (16), optionally having tubular shape, emerging from an outer surface of the manifold (2) transversely, optionally orthogonally, and perimeterally bounding the auxiliary opening (6).

In a 21st aspect according to the preceding aspect, the lip (16) is radially inside the sleeve (15).

In a 22nd aspect according to the 19th, 20th, or 21st aspect, the cross-section (S4) of the auxiliary opening (6) is greater than a minimum distance between an outer surface of the lip (16) and the sleeve (15).

In a 23rd aspect according to the preceding aspect, the ratio between the cross-section (S4) and said minimum distance between the outer surface of the lip (16) and the sleeve (15) is comprised between 0.125 and 0.95.

In a 24th aspect according to any one of the preceding aspects, the cross-section (S4) of the auxiliary opening (6) is smaller than a cross-section (S5) inside the sleeve (15).

In a 25° aspect according to the preceding aspect, the ratio between the cross-section (S4) of the auxiliary opening (6) and the cross-section (S5) inside the sleeve (15) is comprised between 0.025 and 0.4.

In a 26th aspect according to any one of the preceding aspects from the 19th to the 25th, the sleeve (15) has an engagement portion, such as a threaded portion, removably engaged to the valve body (8).

In a 27th aspect according to any one of the preceding aspects, the shutter (12) includes a cup-shaped upper body (19).

In a 28th aspect according to the preceding aspect, the upper body (19) faces the auxiliary opening (6) of the manifold (2) and is configured for obstructing the same auxiliary opening (6) in the closed position of the shutter (12).

In a 29th aspect according to any one of the preceding aspects, the auxiliary shutter (12a) includes a cup-shaped lower body (20).

In a 30th aspect according to the preceding aspect, the lower body (20) is distinct and distanced from the upper body (19).

In a 31st aspect according to any one of the two preceding aspects the lower body (20) is facing the drain (10) and configured for closing said drain (10) in the closed position of the auxiliary shutter (12a).

In a 32nd aspect according to the 27th and 29th aspects, the upper body (19) and lower body (20) of the shutter (12) and auxiliary shutter (12a), respectively, are movable with respect to the valve body in close and apart from each other.

In a 33rd aspect according to the 27th and 29th aspects, in the closed position of the shutter (12) and auxiliary shutter (12a), the distance between said upper and lower bodies (19, 20) is greater than a distance between said bodies in the respective open positions of the shutter (12) and auxiliary shutter (12a).

In a 34th aspect according to the 27th and 29th aspects, the upper and lower bodies (19, 20) have respective perimeter edges (19', 20'), at least partially in contact with an inner surface of the valve body (8), configured to guide the movement of the respective bodies (19, 20) with respect to the valve body (8).

In a 35th aspect according to the 27th aspect, the upper body (19) of the shutter (12) has an end portion (31) at least partially countershaped to the auxiliary opening (6).

In a 36th aspect according to the 27th aspect, the upper body (19) of the shutter (12) has an end portion (31) at least partially countershaped to the lip (16) of the manifold (2).

In a 37th aspect according to any one of the two preceding aspects, the end portion (31), in the closed position of the shutter (12), is configured to occlude the auxiliary opening (6) of the manifold (2).

In a 38th aspect according to the 27th aspect, the upper body (19) of the shutter (12) includes a cavity (32) opposite the end portion (31) and facing the lower body (20) of the shutter (12).

In a 39th aspect according to the preceding aspect, the cavity (32) is in fluid communication with the chamber (7) of the valve body (8) and is configured to house at least the temperature-sensitive element (11).

In a 40th aspect according to the 29th aspect, the lower body (20) of the auxiliary shutter (12a) has a main body (22) on which a respective seat (23) facing the upper body (19) is defined and configured for housing at least part of the temperature-sensitive element (11).

In a 41st aspect according to the 29th aspect, the lower body of the auxiliary shutter (12a) has a hollow rod (24) extending from the main body (22) across the drain (10), on the opposite side to the upper body (19).

In a 42nd aspect according to the preceding aspect, the hollow rod (24) has a channel (25) in fluid communication with the seat (23) of the main body (22).

In a 43rd aspect according to any one of the preceding three aspects, the main body (22) of the lower body (20) has at least one side opening (26) for placing the chamber (7) in fluid communication with the seat (23) of the main body (22).

In a 44th aspect according to the 41st and 42nd aspects, the valve body (8) has a water storage area (28) below the drain (10) and in fluid communication with the channel (25) of the hollow rod (24).

In a 45th aspect according to the preceding aspect, the water storage area (28) is perimeterally bounded by a side wall (28') and inferiorly bounded by an end wall (28").

In a 46th aspect according to the 29th, 41st, and 42nd aspects, the lower body (20) of the auxiliary shutter (12a) includes a first sealing element (27) carried by the hollow rod (24) externally to the channel (25) in interposition between the chamber (7) of the valve body (8) and the drain (10).

In a 47th aspect according to any one of the preceding aspects from 41st to 46th, the lower body (20) of the auxiliary shutter (12a) includes a second sealing element (29) carried by the hollow rod (24) externally to the channel (25) in interposition between the drain (10) and the water storage area (28) of the valve body (8).

In a 48th aspect according to one the two preceding aspects the first and second sealing elements are axially spaced apart.

In a 49th aspect according to the 46th aspect, the first sealing element (27) is configured for preventing the passage of fluids from the chamber (7) through a gap defined, under use conditions of device (1), above the drain (10) between an outer wall of the hollow rod (24) and the valve body (8).

In a 50th aspect according to either the 47th or 48th aspect, the second sealing element (29), in the open position of the auxiliary shutter (12a), defines a gap (30) in interposition between a side wall (28') of the water storage area (28) and the same sealing element (29), configured for placing the water storage area (28) in fluid communication with the drain (10).

In a 51st aspect according to the preceding aspect, the second sealing element (29), in the closed position of the auxiliary shutter (12a), occludes the gap (30) preventing the passage of fluids from the water storage area (28) to the drain (10).

In a 52nd aspect according to the 47th or 48th aspect, the second sealing element (29), in the open position of the auxiliary shutter (12a), is placed, in use, above a connecting edge between the side wall (28') of the water storage area (28) and the drain (10).

In a 53rd aspect according to any one of the preceding aspects, the temperature-sensitive element (11) comprises a case (33a) housed inside the seat (23) of the lower body (20) of the auxiliary shutter (12a).

In a 54th aspect according to the preceding aspect, the case (33a) is made of heat-conducting material.

In a 55th aspect according to any one of the preceding aspects, the temperature-sensitive element (11) includes a deformable component (33) housed inside the case (33a).

In a 56th aspect according to any one of the preceding aspects the deformable component (33), in use conditions of device (1), is deformable between:
an expanded condition in which it has a maximum size, in particular substantially equal to an inner volume of the case (33a),
a contracted condition in which it has a size lower than said maximum size.

In a 57th aspect according to any one of the two preceding aspects, the deformable component (33) is a solid body with variable volume or a fluid with variable volume.

In a 58th aspect according to any one of the five preceding aspects the case (33a) is rigid.

In a 59th aspect according to the preceding aspect, the maximum size of the deformable component is essentially equal to a volume inside the case (33a).

In a 60th aspect according to any one of the preceding aspects, the temperature-sensitive element (11) comprises a rod (21) engaged, at respective ends, to the solid body with variable-volume and to a portion of the upper body (19) of the shutter (12) inside the cavity (32).

In a 61st aspect according to any one of the preceding aspects from the 1st to 59th aspects, the temperature-sensitive element includes a separator (33b) inside the case (33a) and defining a chamber (50) for housing the fluid with variable volume.

In a 62nd aspect according to the preceding aspect, the separator (33b) is axially movable with respect to the case (33a) of the temperature-sensitive element (11) as a result of the transition between the expanded and contracted conditions of the deformable component (33).

In a 63rd aspect according to any one of the three preceding aspects, the temperature-sensitive element comprises a rod (21) engaged at respective ends to the separator (33b) and to a portion of the upper body (19) of the shutter (12) inside the cavity (32).

In a 64th aspect according to any one of the four preceding aspects, the deformable component (33), in the dilated condition, causes a movement of the rod and consequently brings the upper body (19) of the shutter (12) to the respective closed position.

In a 65th aspect according to any one of the preceding aspects from the 58th to 64th, the deformable component (33), in the dilated position, also results in a movement of the lower body (20) of the auxiliary shutter (12a) to its respective closed position.

In a 66th aspect according to any one of the preceding aspects from 53rd to 65th, the case (33a) of the temperature-sensitive element (11) defines, in cooperation with an inner surface of the seat (23) of the lower body (20), one or more respective fluid passages extending between each of the side openings (26) of the main body (20) and the channel (25) of the hollow rod (24).

In a 67th aspect according to any one of the preceding aspects, the valve body (8) comprises a first spring (34) interposed between an upper shoulder (34a) of the valve body (8) facing the valve inlet and the upper body (19) of the shutter (12), optionally the perimeter edge (19') of the upper body (19).

In a 68th aspect according to any one of the preceding aspects, the valve body (8) includes a second spring (35) interposed between a lower shoulder (35a) of the valve body (8) facing the drain (10) and the lower body (20) of the auxiliary shutter (12a), optionally the perimeter edge (20') of the lower body (20).

In a 69th aspect according to any one of the two preceding aspects the first and second springs (34, 35) are configured to move the upper body and the lower body (19, 20) towards each other.

In a 70th aspect according to any one of the preceding aspects the drain (10) for expelling fluid to an environment outside the device is conformed as at least one radial opening made on a side wall of the valve body (8), longitudinally opposite to the valve inlet.

In a 71st aspect according to the preceding aspect (see FIGS. 1 and 4), the drain 10 comprises two or more radial openings circumferentially spaced from each other. For example the at least one radial opening or the two or more radial openings is/are through apertures crossing the thickness of said side wall. Said radial opening or openings may extend orthogonally to the side wall or be inclined with respect to the side wall as long as they are able to cross the side wall and laterally discharge fluid.

In a 72nd aspect a hydraulic plant is provided, for example heating plant of the type located at least partially outside a closed environment to be heated, said plant comprising:
  a thermal unit (101), such as a heat pump, configured for being located outside the closed environment,
  at least one supply line (102) connected to the thermal unit (101),
  at least one return line (103) connected to the thermal unit (101),
  one or more antifreeze devices (1) according to any one of the preceding aspects, each engaged to a respective one of said supply and return lines (102, 103).

In a 73rd aspect a use of the antifreeze device according to any one of the preceding aspects from 1st to 71st aspects is provided in a hydraulic plant, for example a heating plant, for expelling fluid in an environment where during use the device is configured to be in at least three operating conditions:
  a first operating condition where the auxiliary shutter (12a) is in the open position and the shutter (12) is also in the open position,
  a second operating condition where the shutter (12) is in the partially open position while the auxiliary shutter (12a) is in the closed position,
  a third operating condition where the shutter (12) is in the closed position and the auxiliary shutter (12a) is also in the closed position.

In a 74th aspect according to the preceding aspect wherein the second operating condition is an intermediate operating condition between the first and third operating conditions that is achieved in the transition of the antifreeze device from the first to the third operating condition and from the third to the first operating condition.

In a 75th aspect according to any one of the preceding two aspects, the antifreeze device gradually transitions from the first to the second and finally to the third operating condition as the temperature of the fluid in the chamber (7) decreases from 3° ° C. to 0.5° C.

In a 76th aspect according to any one of the above three aspects, the antifreeze device gradually transitions from the third to the second and finally to the first operating condition as the temperature of the fluid in the chamber (7) increases from 0.5° ° C. to 3° C.

BRIEF DESCRIPTION OF THE DRAWINGS

Some embodiments and some aspects of the invention will be described below with reference to the attached drawings, provided for illustrative purposes only and therefore not limiting wherein:

FIG. 4 is a cutaway perspective view of the antifreeze device according to the present invention; and FIG. 5 is a schematic view of a plant according to the present invention.

DEFINITIONS AND CONVENTIONS

Figure 1:
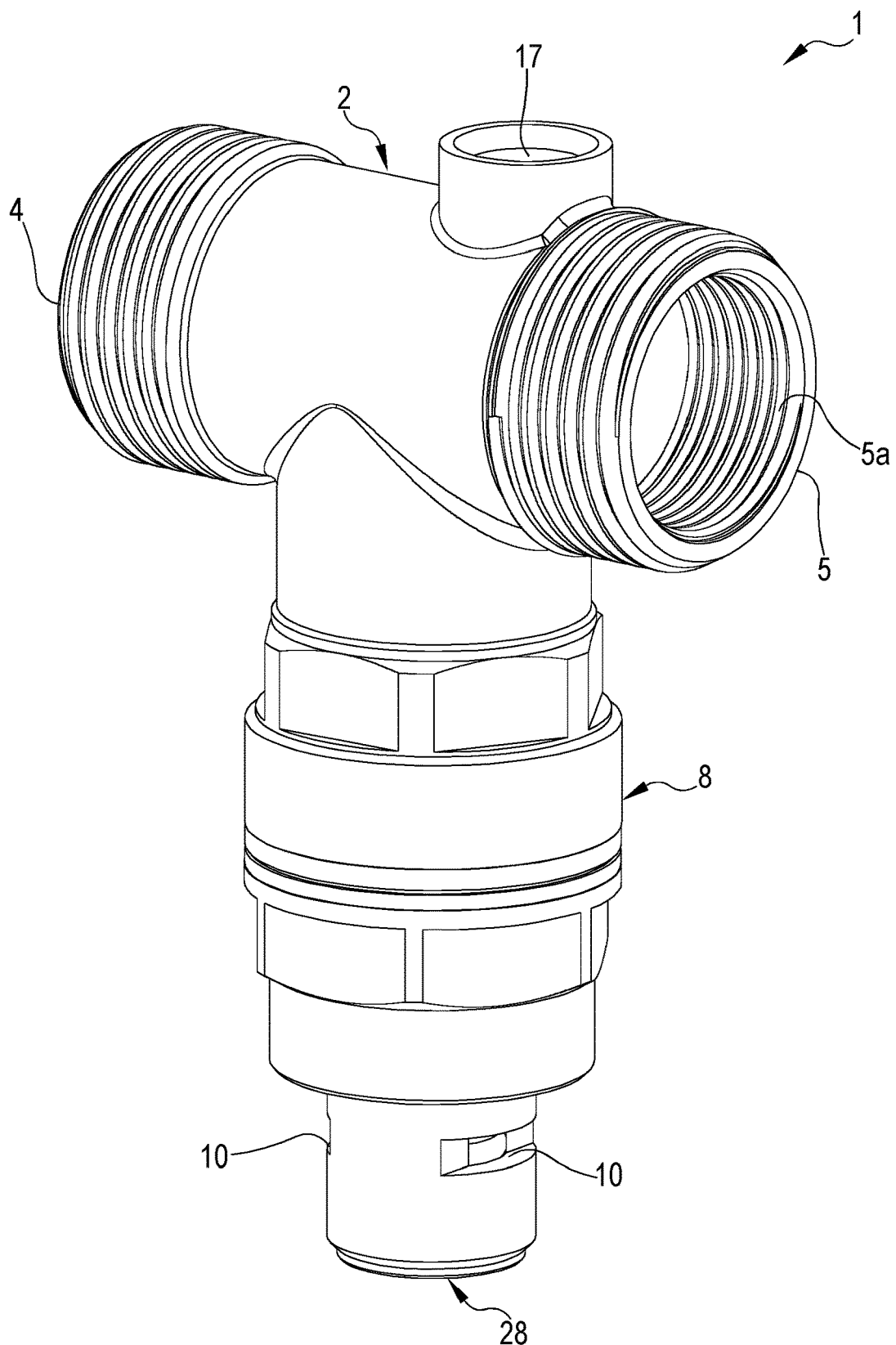
FIG. 1 is a perspective view of the antifreeze device according to the present invention.

Note that in the detailed description corresponding parts illustrated in the various figures are shown with the same numerical references. The figures may illustrate the subject matter of the invention by means of representations that are not to scale; therefore, parts and components illustrated in the figures related to the subject matter of the invention may relate only to schematic representations.

DETAILED DESCRIPTION

An antifreeze device 1 has been generally indicated for hydraulic plants exposed to freezing conditions where the use of antifreeze liquids is not possible for portability reasons. As shown in FIG. 5, the antifreeze device 1 may be installed in a plant 100, such as a heating plant, located at least partially outside a closed environment to be heated, whether industrial or domestic. The plant 100 includes a thermal unit 101, such as a heat pump heating or cooling unit, which can be installed outside the closed environment, to which at least one supply line 102 and at least one return line 103 are connected for distributing fluid from the thermal unit 101 to the interior of the closed environment. The plant 100 further comprises one or more antifreeze devices 1 installed on each of the supply and return lines 102 and 103, preferably at a section of said lines located outside the closed environment, so as to detect a variation in fluid temperature around a predetermined threshold and, depending on the detected temperature value, discharge water into the environment. The antifreeze device 1 described in the following, thus performs the function of preventing water stagnation, and thus the formation of ice, in the supply and return lines which could lead to pipe breakages or water leaks.

Turning now to describe the antifreeze device 1 shown in FIGS. 1-4, it can be made in two pieces that are removably fluid-tight engaged with each other, namely a manifold 2 engageable to the supply and return lines 102, 103 of the plant 100, and by a valve body 8 responsible for discharging water in an environment outside the device 1.

The manifold 2 has a substantially tubular structure comprising an inlet 4 and an outlet 5 with respective engagement portions 4a, 5a, for example threaded or press-fit portions, to allow the manifold 2 to be fluid-tightly engaged with the supply and return lines 102, 103 of the system 100. The manifold 2 also includes a channel 3 that places inlet 4 in fluid communication with outlet 5, allowing the passage of fluid through the aforementioned lines. The channel 3 is laterally bounded by an inner surface also having tubular shape and having a constant cross-section, except for the section of channel 3 where a shoulder 14 is defined, as described in the following. Thus, the collector 2 has a constant cross-section S1, measured internally to the channel 3, for example, ranging in size from 10 mm to 50 mm.

As, for example, shown in FIGS. 2A-2C and 3, representing a longitudinal section of device 1, the manifold 2 at least partially communicates with the valve body 8 by means of an auxiliary opening 6 passing the inner surface of the channel 3 and interposed between the inlet 4 and the outlet 5 of the manifold 2. The auxiliary aperture 6 is laterally bounded by a lip 16, optionally having tubular shape, emerging from an outer surface of manifold 2 on the opposite side from channel 3 and defining a fluid cross-section S3 of auxiliary aperture 6 that is smaller than the constant cross-section S1 of the manifold 2, as it has, for example, dimensions comprised between 5 mm and 20 mm. In a further aspect, the dimensional ratio between the constant cross-section S1 of the manifold 2 and the cross-section S3 of the auxiliary opening 6 may be comprised between 1.5 and 10.

It is worth noting that the manifold 2 also has an orifice 13 distinct from the auxiliary opening 6 and facing the valve body 8 to place it in fluid communication with the channel 3 of the manifold 2. From a structural point of view, the orifice 13 is a small opening, crossing the side wall of the manifold 2 and defined in interposition between the auxiliary opening 6 and the outlet 5 of the manifold 2. In fact, the orifice 13 has, for example, a cross-section S4 comprised between 1 mm and 6 mm, thus being dimensionally smaller than both the constant cross-section S1 of the manifold 2 and the cross-section S3 of the auxiliary opening 6. The ratio between the constant cross-section S1 of the manifold 2 to the cross-section S4 of the orifice 13 is comprised between 1.5 and 50, while the ratio between the cross-section S3 of the auxiliary opening 6 to the cross-section S4 of the orifice 13 is comprised between 1.5 and 20.

Figure 2A:
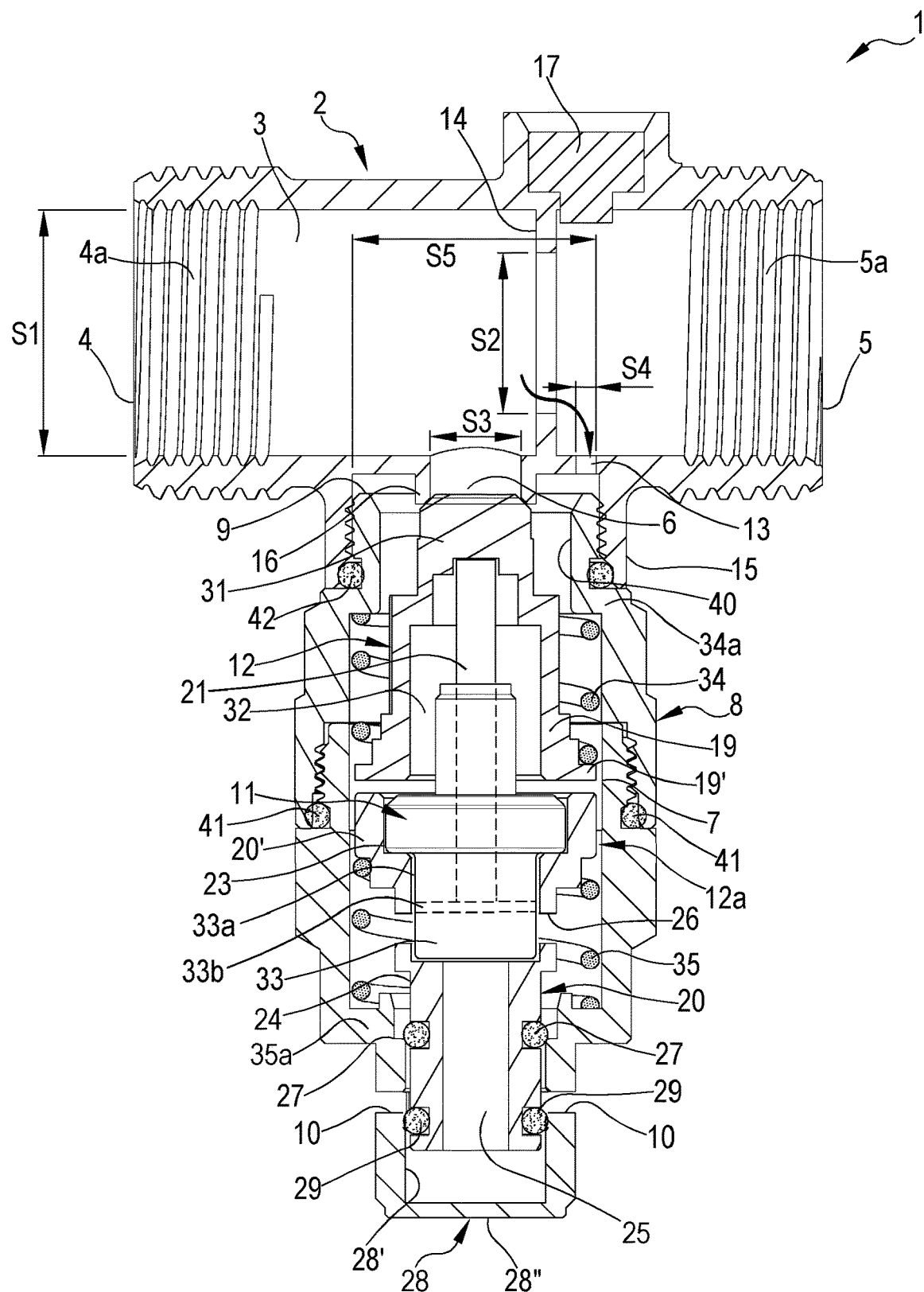
FIG. 2A is a longitudinal cross-section view of the antifreeze device according to the present invention having a shutter and an auxiliary shutter in their respective closed conditions.
Figure 2B:
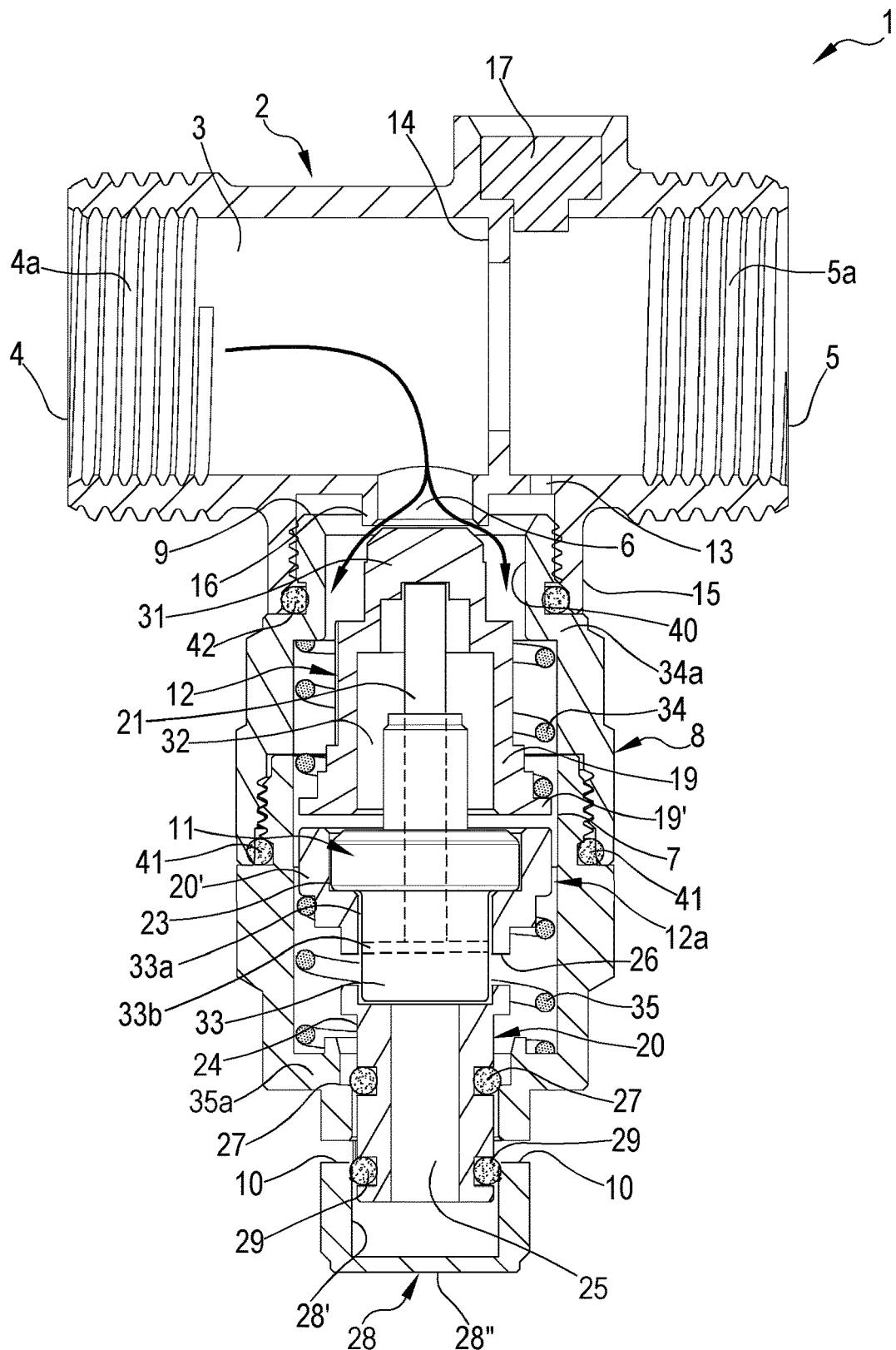
FIG. 2B is a longitudinal cross-section view of the antifreeze device according to the present invention where the shutter is in a partially open position and the auxiliary shutter is in a closed position.
Figure 2C:
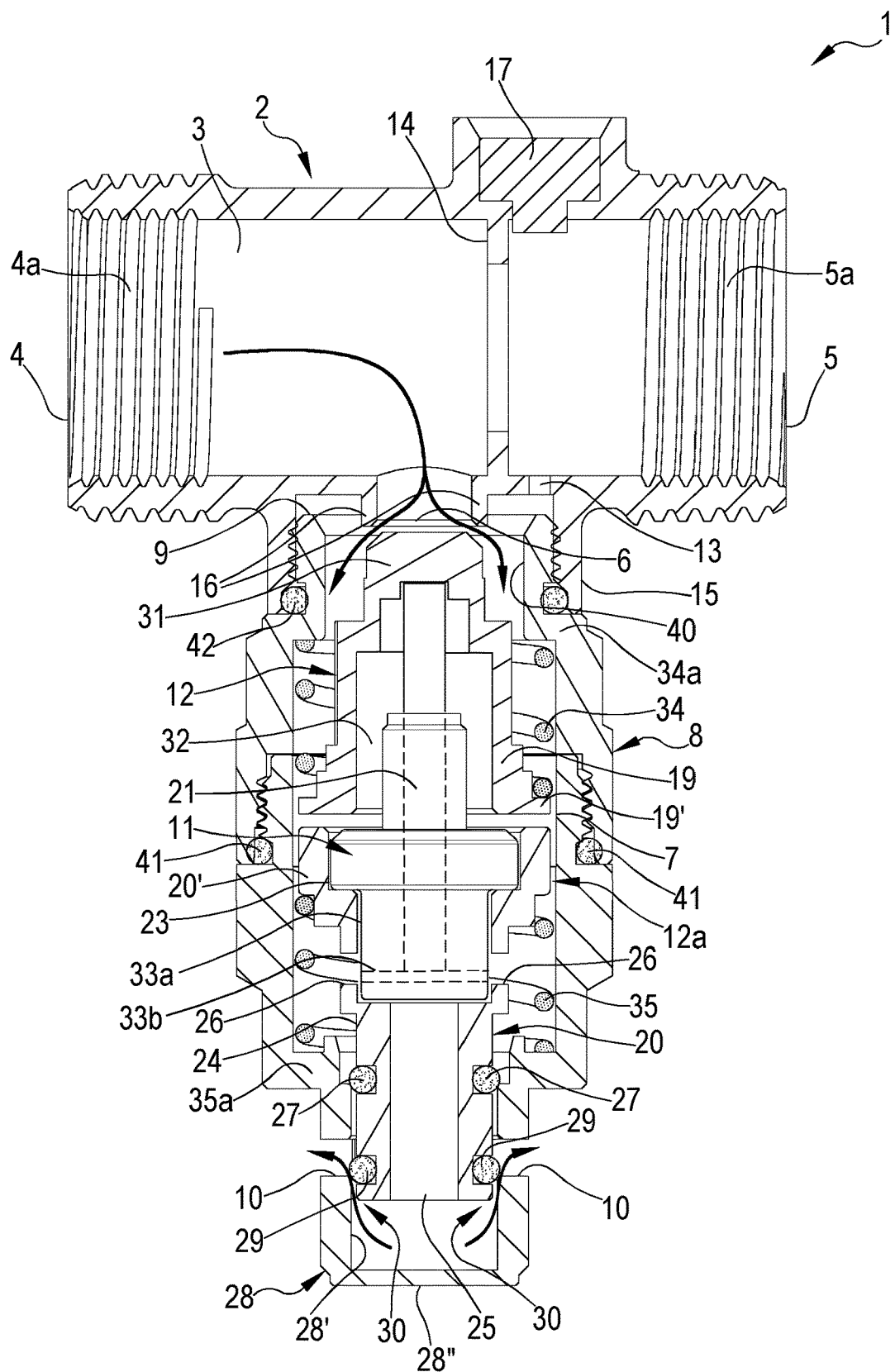
FIG. 2C is a longitudinal cross-section view of the antifreeze device according to the present invention where the shutter and auxiliary shutter are in their respective open conditions.
Figure 3:
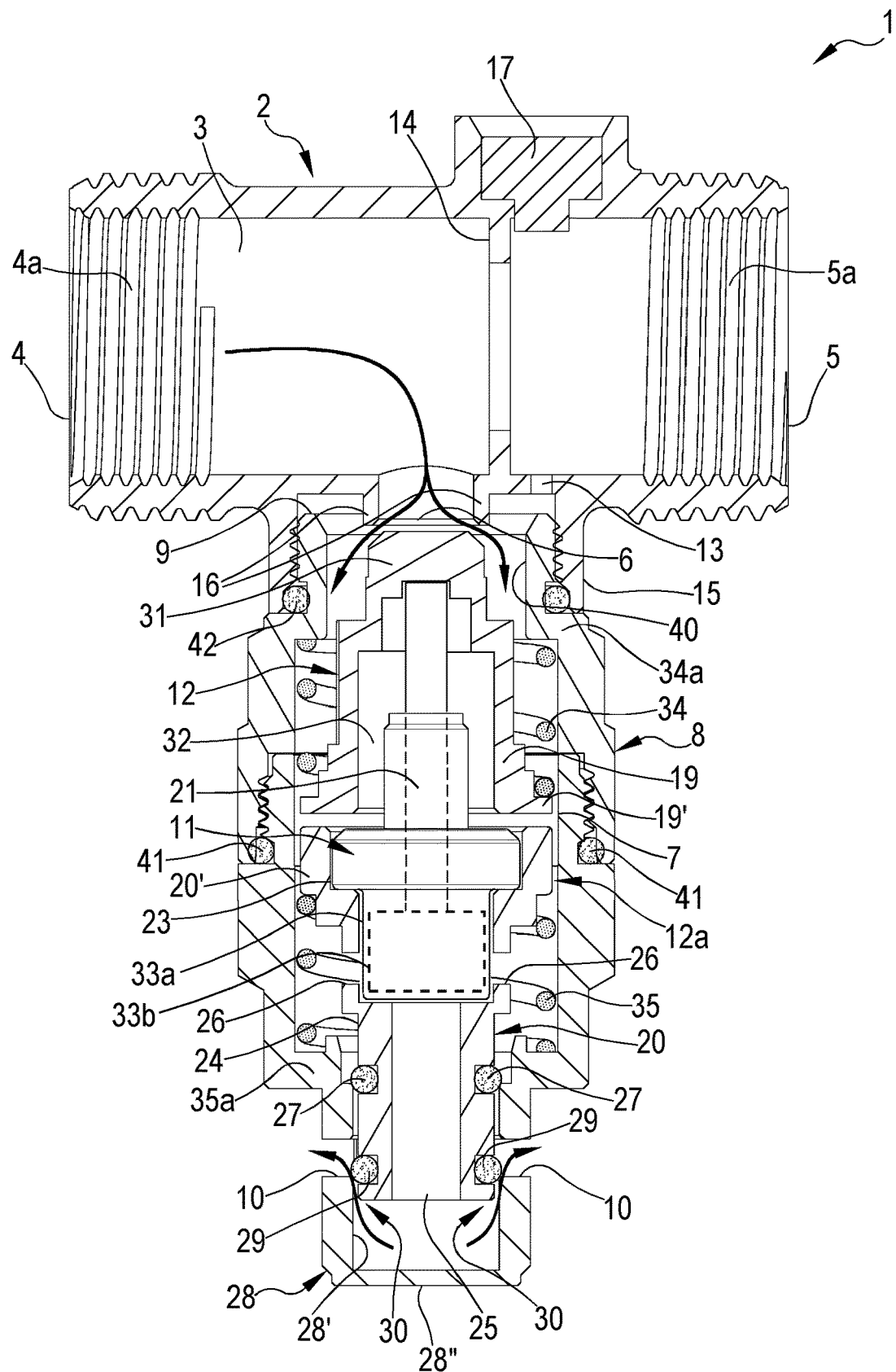
FIG. 3 is a longitudinal sectional view of a variant of the antifreeze device according to the present invention.

Looking at FIGS. 2 and 3 of the antifreeze device 1 in a longitudinal section view, the manifold 2 may also include a radial shoulder 14 in the form of a calibrated septum, emerging from an inner surface of the manifold 2 internally to the channel 3 in interposition between the auxiliary opening 6 and the orifice 13. The shoulder 14 is designed to create a pressure drop between the sections of channel 3 respectively upstream and downstream of the same shoulder 14, to allow effective fluid exchange with the valve body 8. The shoulder 14 effectively defines a necking of the channel 3 with a cross-section S2, with dimensions, for example comprised between 9 mm and 46 mm, which is smaller than the constant cross-section S1 of the manifold, but preferably larger than the cross-sections S3 and S4 respectively of the auxiliary opening 6 and the orifice 13. In other words, the size ratio between the cross-section S2 of the necking and the cross-section S3 of the auxiliary opening 6 is comprised between 1.5 and 9.

The manifold 2 may also include a vacuum breaker valve acting on the channel 3 of the manifold 2 or a cap 17.

The manifold 2 may also comprise a sleeve 15, emerging from an outer surface of the manifold 2 in a transverse direction (e.g., orthogonal) to the channel 3, which surrounds both the auxiliary opening 6 and the orifice 13 of the manifold 2. The sleeve 15 also has an engagement portion, for example a threaded portion, suitable for removably engaging and fluid-tightly engaging with a respective engagement portion, also threaded, of the valve body 8. To seal the engagement between the sleeve 15 and the valve body, the valve device 8 also has a sealing element, such as a gasket 42 shown in FIGS. 3 and 4, interposed between the engagement portions of the sleeve 15 and the valve body 8.

As shown in FIGS. 3 and 4, the sleeve 15 is radially external to the lip 16 bounding the auxiliary aperture 6, resulting spaced from the latter by a minimum distance comprised between 3 mm and 8 mm, which is lower than the cross-section S4 of the auxiliary aperture 6. Specifically, the dimensional relationship between the cross-section S4 and said minimum distance between the outer surface of the lip 16 and the sleeve 15 is comprised between 0.125 and 0.95.

The sleeve 15 has a larger cross-section S5 than the cross-section S3 of the same auxiliary opening 6, for example, ranging in size from 14 mm to 40 mm. In fact, the dimensional ratio between the cross-section S3 of the auxiliary opening 6 and the cross-section S5 inside sleeve 15 is comprised between 0.125 and 0.95.

Turning now to describe the valve body 8, it should be noted that it has a structure made of two pieces, engaged with each other by means of respective engagement portions, optionally threaded, in which fluid sealing is ensured by the presence of a sealing ring 41 interposed between said engagement portions.

The valve body 8 has an inlet 9 facing the auxiliary opening 6 and the orifice 13 of the manifold 2, bounded by a collar 40 engageable to the sleeve 15 at a respective engagement portion, for example threaded. In particular, the collar 40 is radially interposed between the sleeve 15 and the orifice 13 of the manifold 2, thus having a passage cross-section smaller than the passage cross-section S5 of the sleeve 15 itself.

The valve body 8 also includes a drain 10 for expelling fluid to an environment outside the device, conformed as a radial opening made on a side wall of valve body 8, longitudinally opposite to the inlet 9 (see FIGS. 1 and 4). According to what is shown in the accompanying figures, the drain 10 is, preferentially, defined by two or more radial openings circumferentially spaced from each other. For example the at least one radial opening or the two or more radial openings is/are through apertures crossing the thickness of said side wall. Said radial opening or openings may extend orthogonally to the side wall or be inclined with respect to the side wall as long as they are able to cross the side wall and laterally discharge fluid. Below to drain 10, the valve body 8 comprises a water storage area 28 laterally bounded by a side wall 28' of valve body 8 and inferiorly bounded by an end wall 28" of the same valve body 8. In other words, the water storage area 28 defines a blind end of the valve body 8, longitudinally opposite to the inlet 9 and adjacent to the drain 10.

The valve body 8 also includes a chamber 7 that places in fluid communication with the inlet 9 of the valve body 8, one or more shutters to selectively interrupt fluid communication between the inlet 9 and the drain 10 of the valve body 8. In particular, the valve body 8 includes a shutter 12 and an auxiliary shutter 12*a*, both housed within the chamber 7 and movable with respect to the valve body 8 in approaching and moving away from each other to open and close the auxiliary opening 6 of the manifold 2 and the drain 10. Thus, the shutter 12 is movable at least between a closed position where it obstructs the auxiliary opening 6 of the manifold 2 and an open position where it allows fluid to enter through the auxiliary opening 6. The shutter 12 is also movable at least to a partially open position (FIG. 2B) where it defines, in cooperation with a perimeter edge of the auxiliary opening 6, one or more fluid gaps, each of which has a cross-section area smaller than a maximum cross-section area of the fluid passage present in the shutter 12 in the open position (FIG. 2C). Thus, the partially open position defines at least one intermediate open position of the shutter 12 between the open and closed positions. It should be noted that the shutter 12, during the movement between the closed and open positions, positions itself in a plurality of partially open positions, gradually moving between the open and closed positions, and vice versa. Dually to the shutter 12, the auxiliary shutter 12*a* is movable between a respective closed position where it obstructs the outlet 10 of the valve body 8 and a respective open position where it fluidly connects the drain 10 with the external environment of the device 1.

The device is then configured to operate in:
- a first operating condition where the auxiliary shutter (12*a*) is in the open position and the shutter (12) is also in the open position,
- a second operating condition where the shutter (12) is in the partially open position while the auxiliary shutter (12*a*) is in the closed position,
- a third operating condition where the shutter (12) is in the closed position and the auxiliary shutter (12*a*) is also in the closed position.

Now, analyzing the structure of the shutter 12, it includes a cup-shaped upper body 19, which faces the inlet 9 and is configured to selectively close the auxiliary opening 6. Referring to FIGS. 2A-2C and 3, the upper body 19 has an terminal end 31 facing the inlet 9 and at least partially countershaped to the lip 16 of the auxiliary opening 6, configured to fit, in the closed position of the shutter 12, at least partially within the auxiliary opening 6 itself, abutting against an edge of the lip 16 to close the auxiliary opening 6. On the longitudinally opposite of the terminal end 31, the upper body 19 may have a perimeter edge 19' placed at least partially in contact with an inner surface of the chamber 7 and configured to guide the movement of the same upper body 19 with respect to the valve body 8. In practice, the upper edge 19' may comprise a perforated flange, with a fluted perimeter edge or with an edge having one or more suitable gaps, contacting the inner surface of the chamber 7 and simultaneously allows the passage of fluid.

The upper body 19 of the shutter 12 also has a cavity 32, on the opposite side to the end portion 31, in fluid communication with the chamber 7 of the valve body 8 and configured to house at least one temperature-sensitive element 11 detailed in the following.

Finally, it should be noted that the upper body 19 of the shutter 12 does not open or close the orifice 13, which provides a constant fluid communication between the chamber 7 and the channel 3. In other words, the upper body 19 acts in opening and closing on the auxiliary opening 6 only, allowing a constant fluid flow between the channel 3 of the manifold 2 and the chamber 7 through the orifice 13.

Turning now to describe the auxiliary shutter 12*a*, it has a cup-shaped lower body 20, which faces the drain 10 and is configured to close it under predetermined operating conditions of the valve device. The lower body 20 has a main body 22 on which a perimeter edge 20' is defined at least partially in contact with the inner surface of the valve body 8 and configured to guide the movement of the lower body 20 with respect to the valve body 8.

In practice, the lower edge 20' may comprise a flange, for example drilled, with a fluted perimeter edge or with an edge having one or more suitable gaps, contacting the inner surface of the chamber 7 and simultaneously allows the passage of fluid. The main body 22 of the lower body 20 also features:
- a seat 23 facing the upper body 19 and configured to house at least part of the temperature-sensitive element 11,
- a side opening 26 passing a wall of the main body 22 delimiting the seat 23 and suitable for placing the chamber 7 in fluid communication with the seat 23 of the main body 22.

The lower body 20 of the auxiliary shutter 12*a* also has a hollow rod 24 extending from the main body 22 on the opposite side to the upper body 19 towards the drain 10. The hollow rod 24 has an elongated tubular conformation that crosses the drain 10 to the water storage area 28 and has a channel 25 configured to place the seat 23 of the main body 22 in fluid communication with the water storage area 28.

The lower body 20 of the auxiliary shutter 12*a* also has a first and second sealing elements 27, 29, for example gaskets or O-rings, axially spaced to each other and carried by the hollow rod 24 externally to the channel 25. The first sealing element 27 is located in interposition between the chamber 7 of the valve body 8 and the drain 10 and is configured to prevent the passage of fluids from the chamber 7, through a gap defined above the drain 10, between an outer wall of hollow rod 24 and the valve body 8.

On the other hand, the second sealing element 29 is in interposition between the drain 10 and the water storage area 28 of the valve body 8 to selectively allow the passage of fluid from the water storage area 28 itself to the drain 10. Under use conditions of the device 1, and in particular in the open position of the auxiliary shutter 12*a*, the second sealing element 29 is placed above a connecting edge between the side wall 28' of the water storage area 28 and the drain 10. Under this condition, the second sealing element 29 defines a gap 30 in interposition between the side wall 28' of the water storage area 28 and the sealing element 29 itself, to place the water storage area 28 and the drain 10 in fluid communication. In other words, the fluid inside the water storage area 28 is expelled from the drain 10 through the gap 30. It should be noted that a seal, such as the second sealing element 29, which defines a gap between the seal itself and the drain, allows fluid to be effectively expelled, preventing or limiting the introduction of dust or debris that at most could settle in the water storage area in contact with the end wall 28", thus not preventing the entire valve device 8 to work properly. In the closed position of the auxiliary shutter 12a, the second sealing element 29 occludes the gap 30, thus preventing the passage of fluids from the water storage area 28 toward the drain 10.

The valve body 8 also includes a temperature-sensitive element 11 mechanically engaged to both the shutter 12 and the auxiliary shutter 12a. As described in the following, the temperature-sensitive element 11 is at least responsible for the movement of the upper body 19 of the valve shutter 12 and the lower body 20 of the valve shutter 12 away from each other in their respective open and closed positions and, for the valve shutter 12, in the partial open position.

The temperature-sensitive element 11 is sensitive to variations in temperature and is at least partially deformable, optionally linearly, if the atmospheric temperature or the temperature of the fluid present within the chamber 7 has a value lower than a predetermined threshold value comprised between 0° C. and 10° C., optionally substantially equal to 7° C. Said temperature-sensitive element 11 may comprise a case 33a, optionally made of a heat conducting material (e.g., copper or aluminum), at least partially housed inside the seat 23 of the lower body 20 of the auxiliary shutter 12a. The case 33a may be rigid and define, in cooperation with an inner surface the seat 23 of the lower body 20, respective fluid passages extending between each side opening 26 of the main body 20 and the channel 25 of the hollow rod 24. The case 33a, in cooperation with the auxiliary shutter 12a, thus allows the chamber 7 to be placed in fluid communication with the water storage area 28.

The temperature-sensitive element 11 may also include a deformable component 33, placed in a volume inside the enclosure and deformable at least between a contracted condition if the atmospheric or fluid temperature in the chamber 7 is lower than the threshold temperature and an expanded condition if the atmospheric or fluid temperature is greater than the threshold temperature. In the expanded condition, the deformable component 33 has a maximum size, which may be equal to an internal volume of the case 33a while, in the contracted condition, the deformable component 33 has a size lower than said maximum size. In this condition, the deformable component 33 allows the progressive movement of the shutter 12 from the closed position to the partial open position and then to the open position, as well as the movement of the auxiliary shutter 12a from the closed position to the open position.

As shown in FIG. 3, the deformable component 33 can be a wax body (or other material that contracts with decreasing temperature) housed inside the housing 33a. The deformable component has a variable volume as a function of a temperature variation to which said deformable component is exposed, to allow the movement of the shutter 12 and the auxiliary shutter 12a between the open and closed positions.

The temperature-sensitive element 11 may also include a rod 21 engaged, at respective ends, to the deformable component 33 and to a portion of the upper body 19 inside the cavity 32. The rod 21 may be rigid, made of a non-temperature-sensitive material, or it can also be part of the deformable component 33 and thus be made of a temperature-sensitive material, thus resulting deformable depending on the temperature of the fluid in chamber 7.

In an alternative embodiment of the temperature-sensitive element 11, the deformable component 33 may be a fluid or gel with variable volume as a function of temperature variations (FIGS. 2A-2C). According to this embodiment, the temperature-sensitive element 11 may comprise a separator 33b, internal to the housing 33a and defining a chamber 50 for housing the fluid or gel with variable volume. The separator 33b is axially movable with respect to the case 33a of the temperature-sensitive element 11 as a result of the transition between the expanded and contracted conditions of the deformable component 33 or as a result of the expansion or contraction of the fluid or gel with variable volume.

The valve body 8 may also comprise a first and a second spring 34, 35 that respectively act on the upper body 19 and the lower body 20 by moving the upper and lower bodies 19, 20 close to each other. In detail, the first spring 34 is interposed between an upper shoulder 34a of the valve body 8 facing the inlet 9 and the upper body 19 of the shutter 12, while the second spring is interposed between a lower shoulder 35a of the valve body 8 facing the drain 10 and the lower body 20 of the auxiliary shutter 12a.

As mentioned above, the first and second springs 34, 35 have a predetermined elastic preload, configured to oppose the stroke of the shutter 12 and the auxiliary shutter 12a, compressing only as a result of the expansion of the deformable component 33 from the contracted condition to the dilated condition. The second spring 35 also supports the auxiliary shutter 12a, preventing its axial displacement when the auxiliary shutter 12a itself is subjected to an axial force directed toward the drain 10, which is lower than the preload of the second spring 35 itself.

Turning now to describe the operation of the valve device 1, in the condition where the temperature of the working fluid flowing through the channel 3 is above the threshold temperature value, the deformable component 33 of the temperature-sensitive element 11 is in the dilated condition and moves the shutter 12 and the auxiliary shutter 12a to their respective closed positions, allowing the fluid to circulate or station in the supply and return lines 102, 103 without any risk of freezing. In this condition, the orifice 13 of the manifold 2 allows the fluid to enter the manifold inside the chamber 7 of valve body 8. The fluid is then pressurized inside the chamber 7.

In the case where the fluid temperature is lower than the predetermined threshold value, the deformable component 33 of the temperature-sensitive element 11, starting from the contracted condition (FIG. 2A), allows the springs 34 and 35 to move the shutter 12 and the auxiliary shutter 12a closer together to bring the shutter 12 to the partially open position (the auxiliary shutter 12a to the closed position). In this condition, and due to the pressure difference at the ends of the shoulder 14, additional fluid enters the chamber 7 of the valve body through the auxiliary opening 6, which laps the temperature-sensitive element 11. Subsequently, there is a gradual movement of the shutter 12 and the auxiliary shutter 12a to their respective open positions, allowing fluid to be discharged through the gap 30 and then through the drain 10 (FIG. 2C), thus preventing the formation of ice in the supply and return lines 102, 103 of plant 100.

Considering now a condition in which the fluid temperature is lower than the threshold temperature value and assuming that the thermal unit 101 is turned on, hot fluid (i.e., with temperature higher than the above threshold temperature value) enters in the chamber 7 to contact and heat the case 33a and the deformable component 33 at a temperature higher than the predetermined threshold temperature value, resulting in deformation of the deformable component from the contracted condition to the expanded condition and causing a movement of the shutter 12 and the auxiliary shutter 12a to their respective closed positions.

The invention claimed is:
1. Antifreeze device for hydraulic plants including:
a manifold having a manifold inlet, a manifold outlet, and
a channel placing the manifold inlet in fluid commu- nication with the manifold outlet, said manifold including an auxiliary opening between the manifold inlet and the manifold outlet,
a valve body engaged to the manifold and comprising:
  a valve inlet facing the auxiliary opening of the manifold,
  a drain for discharging fluid in the environment,
  a chamber placing the valve inlet of the valve body in fluid communication with the drain of the valve body,
  a thermosensitive element housed in the chamber and sensitive to temperature variations,
  a shutter engaged to the thermosensitive element and movable between:
    a closed position where said shutter closes the auxiliary opening of the manifold,
    an open position where said shutter allows fluid to enter through the auxiliary opening, wherein the manifold includes an orifice, distinct from the auxiliary opening and facing the valve inlet of the valve body, the orifice placing the chamber of the valve body in fluid communication with the channel of the manifold, wherein the drain is opposite to the valve inlet of the valve body.

2. Antifreeze device according to claim 1, wherein said shutter does not open or close the orifice, the orifice constantly defining a fluid communication between said chamber and said channel.

3. Antifreeze device according to claim 1, wherein the orifice is an opening passing through a perimeter wall of the manifold, between the auxiliary opening and the manifold outlet.

4. Antifreeze device according to claim 1, wherein:
the manifold has a constant cross-section for a part of the channel,
the orifice has a cross-section smaller than the constant cross-section of the manifold,
the auxiliary opening has a cross-section smaller than the constant cross-section of the manifold.

5. Antifreeze device according to claim 4, wherein:
the manifold has a radial shoulder, emerging from an inner surface of the manifold inside the channel,
said shoulder is interposed between the auxiliary opening and the orifice,
shoulder defines a necking of the channel having a cross-section smaller than the constant cross-section of the manifold.

6. Antifreeze device according to claim 1 wherein the manifold includes:
a sleeve emerging from an outer surface of the manifold transversely to the channel, wherein said sleeve surrounds the auxiliary opening and the orifice of the manifold,
a lip of tubular shape transversally emerging from an outer surface of the manifold, said lip extending about the auxiliary opening radially inside said sleeve;
wherein the sleeve surrounds the auxiliary opening and the orifice of the manifold and wherein the sleeve has an engagement portion removably engaged to the valve body.

7. Antifreeze device for hydraulic plants including:
a manifold having a manifold inlet, a manifold outlet, and a channel placing the manifold inlet in fluid communication with the manifold outlet, said manifold including an auxiliary opening between the manifold inlet and the manifold outlet,
a valve body engaged to the manifold and comprising:
  a valve inlet facing the auxiliary opening of the manifold,
  a drain for discharging fluid in the environment,
  a chamber placing the valve inlet of the valve body in fluid communication with the drain of the valve body,
  a thermosensitive element housed in the chamber and sensitive to temperature variations,
  a shutter engaged to the thermosensitive element and movable between:
    a closed position where said shutter closes the auxiliary opening of the manifold,
    an open position where said shutter allows fluid to enter through the auxiliary opening,
  wherein the manifold includes an orifice, distinct from the auxiliary opening and placing the chamber of the valve body in fluid communication with the channel of the manifold,
  wherein the antifreeze device further comprises an auxiliary shutter configured to be movable between:
    a closed position where said auxiliary shutter closes the drain of the valve body,
    an open position where said auxiliary shutter places the drain in fluid communication with an environment outside the device.

8. Antifreeze device according to claim 7 configured to operate in:
an first operative condition in which the auxiliary shutter is in the open position and the shutter is also in the open position,
a second operative condition in which the shutter is in the partially open position while the auxiliary shutter is in the closed position,
a third operative condition in which the shutter is in the closed position and the auxiliary shutter is also in the closed position.

9. Antifreeze device according to claim 7, wherein the shutter comprises an upper body facing the auxiliary opening of the manifold and configured for obstructing the same auxiliary opening in the closed position of the shutter, and wherein the auxiliary shutter comprises a lower body, distinct and spaced from the upper body and facing the drain, the upper body being configured to obstruct said drain in the closed position of the auxiliary shutter,
wherein the upper body and lower body of the shutter and of the auxiliary shutter, respectively, are movable with respect to the valve body close and apart from each other, wherein, in the closed position of the shutter and auxiliary shutter the distance between the upper body and the lower body is greater than a distance between said bodies in the respective opening conditions of the shutter and of the auxiliary shutter.

10. Antifreeze device according to claim 9, wherein the upper body and the lower body have respective perimeter edges, at least partially in contact with an inner surface of the valve body, configured for guiding the movement of the respective bodies with respect to the valve body, wherein the upper body of the shutter includes:
an end portion at least partially countershaped to the auxiliary opening of the manifold, said end portion, in the closed position of the shutter, being configured for occluding the auxiliary opening of the manifold,
a cavity opposite the end portion and facing the lower body of the shutter, said cavity being in fluid communication with the chamber of the valve body and configured for housing the thermosensitive element.

11. Antifreeze device according to claim 10, wherein the lower body of the auxiliary shutter has:
- a main body defining a respective seat facing the upper body and configured for housing at least part of the thermosensitive element,
- a hollow rod extending from the main body across the drain, on the opposite side from the upper body,
- wherein said hollow rod has a channel in fluid communication with the seat of the main body,
- wherein the main body of the lower body has at least one side opening for placing the chamber in fluid communication with the seat of the main body.

12. Antifreeze device of claim 11, wherein the valve body has a water storage area below the drain and in fluid communication with the channel of the hollow rod, said water storage area being laterally delimited by a side wall and inferiorly delimited by an end wall.

13. Antifreeze device according to claim 12, wherein the lower body of the auxiliary shutter comprises:
- a first sealing element carried by the hollow rod externally to the channel in interposition between the chamber of the valve body and the drain,
- a second sealing element carried by the hollow rod externally to the channel in interposition between the drain and the water storage area of the valve body,
- wherein the first and second sealing elements are axially spaced apart,
- wherein the first sealing element is configured for preventing the passage of fluids from the chamber through a gap defined, in use conditions of the device, above to the drain between an outer wall of the hollow rod and the valve body,
- wherein the second sealing element, in the open position of the auxiliary shutter, defines a gap in interposition between a side wall of the collection area and the same second sealing element, configured for placing the water storage area in fluid communication with the drain,
- wherein the second sealing element, in the closed position of the auxiliary shutter, occludes the gap preventing the passage of fluids from the water storage area to the drain,
- wherein the second sealing element, in the open position of the auxiliary shutter, is placed above a connecting edge between the side wall of the collection area and the drain.

14. Antifreeze device according to claim 11, wherein the thermosensitive element comprises:
- a case of heat-conducting material housed inside the seat of the lower body of the auxiliary shutter,
- a deformable component housed inside the case.

15. Antifreeze device according to claim 14, wherein the case is rigid and the deformable component is a variable volume solid body or a variable volume fluid, said deformable component, in use conditions of the device, is deformable between:
- an expanded condition in which it has a maximum size, substantially equal to an inner volume of the case,
- a contracted condition in which it has a size lower than said maximum size.

16. Antifreeze device according to claim 15, wherein the thermosensitive element includes:
- a rod engaged at respective ends to the variable volume solid body and a portion of the upper body of the shutter inside the cavity, wherein the deformable component, in the expanded condition, determines the movement of the rod and consequently brings the upper body of the shutter in the respective closed position,
- wherein the deformable component, in the expanded condition, also determines a movement of the lower body of the auxiliary shutter in the respective closed position, and
- wherein the case of the thermosensitive element defines, in cooperation with an inner surface of the seat of the lower body, one or more fluid passages extending between each of the side openings of the main body and the channel of the hollow rod;

or wherein in a second alternative the thermosensitive element includes:
- a separator inside the case and defining a further chamber for housing the variable volume fluid, said separator being axially movable with respect to the casing of the thermosensitive element as a result of the transition between the expanded and contracted conditions of the deformable element, and
- a rod engaged, at respective ends, to the separator and a portion of the upper body of the shutter inside the cavity;
- wherein the deformable component, in the expanded condition, determines the movement of the rod and consequently brings the upper body of the shutter in the respective closed position,
- wherein the deformable component, in the expanded condition, also determines a movement of the lower body of the auxiliary shutter in the respective closed position, and
- wherein the case of the thermosensitive element defines, in cooperation with an inner surface of the seat of the lower body, one or more fluid passages extending between each of the side openings of the main body and the channel of the hollow rod.

17. Antifreeze device according to claim 9, wherein the valve body comprises:
- a first spring interposed between an upper shoulder of the valve body facing the valve inlet and the upper body of the shutter,
- a second spring interposed between a lower shoulder of the valve body facing the drain and the lower body of the auxiliary shutter.

18. Antifreeze device according to claim 7, wherein said shutter does not open or close the orifice, the orifice constantly defining a fluid communication between said chamber and said channel.

19. Antifreeze device according to claim 7, wherein:
- the manifold has a constant cross-section for a part of the channel,
- the orifice has a cross-section smaller than the constant cross-section of the manifold,
- the auxiliary opening has a cross-section smaller than the constant cross-section of the manifold.

20. Antifreeze device for hydraulic plants including:
- a manifold having a manifold inlet, a manifold outlet, and a channel placing the manifold inlet in fluid communication with the manifold outlet, said manifold including an auxiliary opening between the manifold inlet and the manifold outlet,
- a valve body engaged to the manifold and comprising:
  - a valve inlet facing the auxiliary opening of the manifold,
  - a drain for discharging fluid in the environment, a chamber placing the valve inlet of the valve body in fluid communication with the drain of the valve body, a thermosensitive element housed in the chamber and sensitive to temperature variations, a shutter engaged to the thermosensitive element and movable between:
- a closed position where said shutter closes the auxiliary opening of the manifold,
- an open position where said shutter allows fluid to enter through the auxiliary opening, wherein the manifold includes an orifice, distinct from the auxiliary opening and placing the chamber of the valve body in fluid communication with the channel of the manifold, wherein the shutter, in the open position, defines, in cooperation with a perimeter edge of the auxiliary opening, a fluid passage having maximum cross-section, wherein said shutter is also movable in a partially open position wherein it defines, in cooperation with the perimeter edge of the auxiliary opening, a fluid passage having a cross-section smaller than the maximum cross-section.

21. Antifreeze device according to claim 20, wherein said shutter does not open or close the orifice, the orifice constantly defining a fluid communication between said chamber and said channel.

22. Antifreeze device according to claim 20, wherein:
the manifold has a constant cross-section for a part of the channel,
the orifice has a cross-section smaller than the constant cross-section of the manifold,
the auxiliary opening has a cross-section smaller than the constant cross-section of the manifold.

23. Antifreeze device for hydraulic plants including:
a manifold having a manifold inlet, a manifold outlet, and a channel placing the manifold inlet in fluid communication with the manifold outlet, said manifold including an auxiliary opening between the manifold inlet and the manifold outlet, a valve body engaged to the manifold and comprising:
a valve inlet facing the auxiliary opening of the manifold,
a drain for discharging fluid in the environment,
a chamber placing the valve inlet of the valve body in fluid communication with the drain of the valve body,
a thermosensitive element housed in the chamber and sensitive to temperature variations,
a shutter engaged to the thermosensitive element and movable between:
- a closed position where said shutter closes the auxiliary opening of the manifold,
- an open position where said shutter allows fluid to enter through the auxiliary opening, wherein the drain comprises a through opening on a side wall of the valve body, said through opening extending transversally or radially to the side wall.

24. Antifreeze device according to claim 23, wherein the manifold comprises an orifice, distinct from the auxiliary opening and facing the valve inlet of the valve body, the orifice placing the chamber of the valve body in fluid communication with the channel of the manifold, wherein said shutter does not open or close the orifice, the orifice constantly defining a fluid communication between said chamber and said channel.

25. Antifreeze device according to claim 23, wherein:
the manifold comprises an orifice, distinct from the auxiliary opening and facing the valve inlet of the valve body, the orifice placing the chamber of the valve body in fluid communication with the channel of the manifold,
the manifold has a constant cross-section for a part of the channel,
the orifice has a cross-section smaller than the constant cross-section of the manifold,
the auxiliary opening has a cross-section smaller than the constant cross-section of the manifold.

\* \* \* \* \*